Oct. 2, 1951        F. A. PALMER        2,570,070
SHIPPING CONTAINER
Filed Aug. 25, 1948
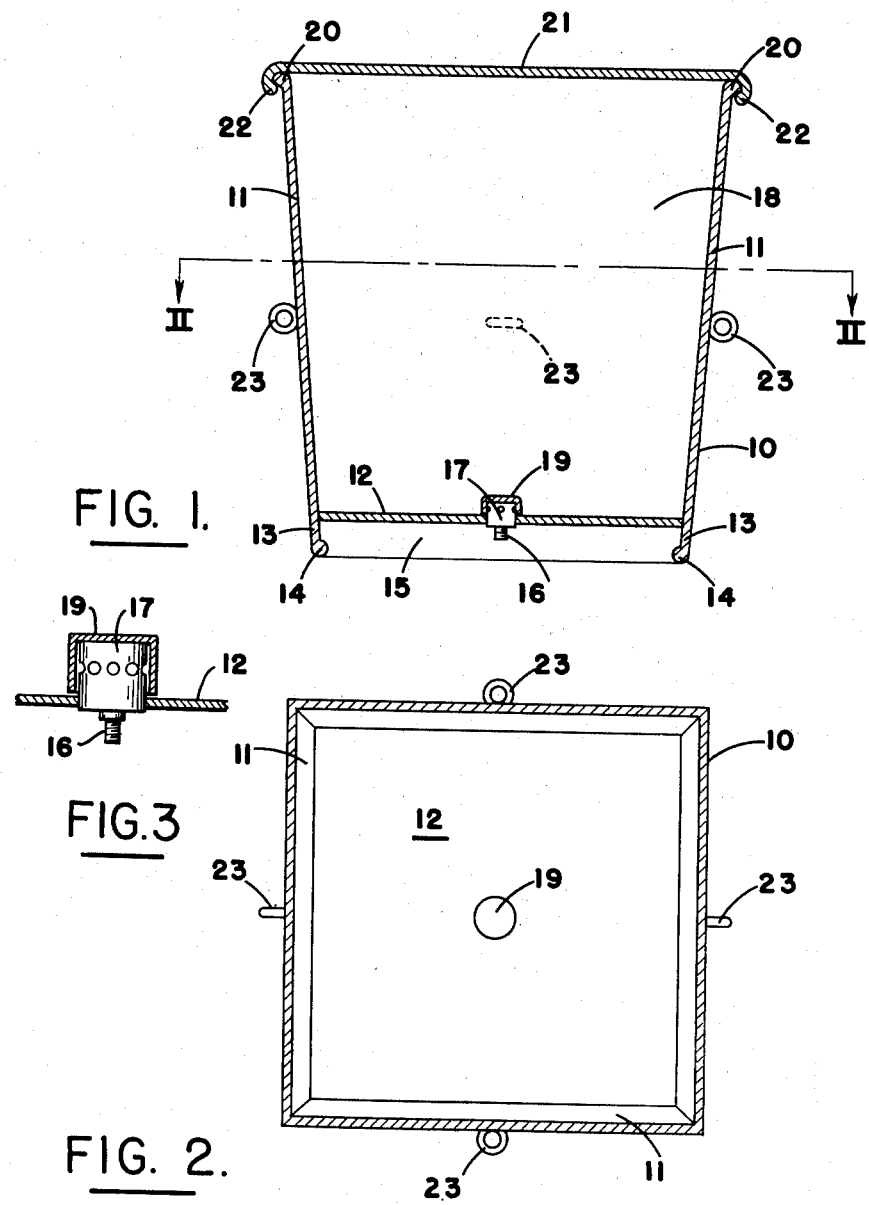
Frederick A. Palmer, INVENTOR.
BY
AGENT.

Patented Oct. 2, 1951

2,570,070

UNITED STATES PATENT OFFICE 2,570,070

SHIPPING CONTAINER

Frederick A. Palmer, Wooster, Tex., assignor, by mesne assignments, to Standard Oil Development Company, Elizabeth, N. J., a corporation of Delaware Application August 25, 1948, Serial No. 46,164

1 Claim. (Cl. 214—1.1)

The present invention is directed to a container adapted for use in shipping high molecular weight polymers having the characteristics of rubber. More particularly, the invention is concerned with a container from which high viscosity, high molecular weight materials may be removed easily.

In the last ten years the synthetic rubber industry has developed to commercial importance. The rubber produced by chemical means is usually a copolymer, in one instance a copolymer of a diolefin such as butadiene and styrene and in another instance a copolymer of a tertiary olefin such as isobutylene and a diolefin such as butadiene and isoprene. These materials are usually produced in manufacturing centers removed from the rubber processing centers; that is to say, the synthetic rubber industry has built up largely adjacent the oil refining industry which is usually located in Coastal areas whereas the synthetic rubber manufacturing industry has been located adjacent the automobile industry. It will be readily seen that the synthetic rubber industry may be a considerable distance from the rubber manufacturer or processing industry and, thus, the synthetic rubber must be shipped over long distances to the manufacturing or processing sites.

The synthetic rubbers such as the copolymers resulting from tertiary olefins and diolefins are subject to cold flow; that is to say, under ordinary atmospheric conditions the synthetic rubber will flow and adhere to containers in which it is shipped. It is customary to ship synthetic rubber such as copolymers of isobutylene and isoprene in 50 pound cardboard containers. This has been satisfactory to some extent but the cold flow characteristics of synthetic rubber have resulted in the material adhering to the cardboard containers. Thus, when the shipment arrives at the processing center, the synthetic rubber must be removed from the containers, and when it is removed a considerable amount of cardboard usually becomes associated with the synthetic rubber. This is undesirable to the processer and manufacturer of rubber articles since the cardboard is an impurity and must be removed.

One solution of the problem has been to coat the interior of the cardboard containers with a dust which prevents the rubber from adhering to the cardboard. Such materials include compositions of talc, sodium or zinc stearate, and the like, and have been used with success. However, from time to time, even when coating agents such as have been illustrated are employed in the containers, the rubber still adheres to the cardboard; the receiver of the synthetic material finds his raw material contaminated with cardboard.

Another objection to the employment of cardboard containers is that such containers may be used only once. Thus, the cardboard containers themselves are a total loss. The manufacturer of the synthetic rubber must add the cost of the containers on to the cost of the synthetic rubber in setting a price on the material. This price is ultimately passed on to the manufacturer of the rubber article who in turn passes the price on to the consumer. It will be seen, therefore, that the cost of these sometimes unsatisfactory cardboard containers adds greatly to the cost of the manufactured material produced from synthetic rubber. For this country to compete on an economic basis with natural rubber, it is necessary to provide the synthetic product to the public in the cheapest form possible.

Therefore, the main object of the present invention is to provide a container for synthetic rubber and other highly viscous materials which may be used continuously.

Another object of the present invention is to provide a container in the form of a frustrum of a pyramid which may be easily emptied of highly viscous material.

The objects of the present invention may be achieved by providing a container comprising a straight sided wall portion in the form of a frustrum of a pyramid which has a comparatively small taper from top to bottom. The bottom portion of the container is smaller than the top portion of the container and forms a footing for the container. Adjacent the bottom the container has a rigid closure which extends across the wall portion and defines a recessed space underneath the container. That is to say, the closure at the bottom is located a short distance above the point where the footing rests on the surface on which the container is placed. Communicating with the interior of the container is an inlet which may be a simple conduit but which is preferably a check valve placed in the bottom closure. This inlet is in communication with the area encompassed by the interior walls of the container and allows pressure to be placed on the contents thereof by connection of a source of pressure such as air under superatmospheric pressure to the inlet means. The inlet preferably has a cover member arranged on it within said container to prevent fouling of the inlet with the material placed in the container. Thus, for example, if the inlet means is a check valve, it may have a cover plate arranged over and around the check valve to allow functioning thereof and to prevent it from becoming fouled with the viscous material which may be placed in the container. On the outer surface of the wall portion at a point located below the center of gravity of the container there is provided engaging means in the form of rings, hooks, shoulders, and the like by means of which lines, chains, and other lifting devices may be attached. On the outer periphery of the top of the container there is arranged an exterior shoulder on which may rest a removable cover member or plate, the cover member or plate engaging frictionally with the shoulder and is provided with a means to engage said shoulder and seal said container. The container and rigid closure members are preferably constructed of sheet metal, such as sheet steel.

The objects of the container of the present invention will be further understood by reference to the drawing in which Figure 1 shows a sectional view of a rectangular container 10 in the shape of a truncated pyramid or as a frustrum of a rectangular pyramid, and Figure 2 is a view of container 10 of Figure 1 looking downwardly into said container.

Figure 3 is an enlarged view of the valve 17 and removable cover 19 of the container 10.

Referring now to the drawing and particularly to Fig. 1, numeral 11 designates a wall portion of a frustrum of a rectangular pyramid. Numeral 12 designates a bottom member forming a bottom closure and extends across and is rigidly affixed to the wall portion 11. The wall portion 11 of the container tapers downwardly to a bottom portion 13 which is turned under slightly and lapped over to form the footing 14. The bottom portion 13, the footing 14 and the outer surface of closure 12 define a recessed space 15. Thus it will be seen that the footing 14 rests directly on the surface on which the container is placed while the bottom plate 12 is slightly above the surface and does not rest directly thereon. Centered on the closure member 12 is an inlet 16 including a check valve 17. Inlet 16 provides communication from space 15 to the space 18 defined by the wall portion 11 of the container. The check valve 17 is provided with a cover plate 19 to prevent material from fouling the valve and thus preventing it from operating as it should. Arranged around the top of the container and around the periphery of the side wall 11 is a shoulder 20 on which may rest a cover plate 21. The cover plate 21 is provided with an engaging means 22 which frictionally engages with the shoulder 20 and allows sealing of the contents of the container. For example, engaging means 22 may include an expandable lip on the cover plate which has sufficient spring in it to engage with shoulder 22 when the cover plate 21 is pressed firmly downwardly thereon.

Arranged on the outer surface of wall 11 in opposite relation to each other are at least two engaging means such as flexible rings 23 which are located at a point below the center of gravity of the container 10. The purpose of the engaging means 23 is to allow the container 10 to be inverted and thus to allow dumping of the contents thereof.

Figure 2 is a view looking downwardly into the container 10 with the cover plate 21 removed showing the interior arrangement of the container.

The container of the present invention will usually be constructed of a sufficient size to accommodate 25, 50, 75, and 100 pounds of rubber. Suitable dimensions of a container of 100 pound capacity will include an overall depth from the bottom of the container to the top thereof of 20 inches with the top opening about 18 inches square and the bottom plate about 14 inches square. The footing 14 may be approximately 13¾ inches square with the recessed space defined by the outer surface of plate 12, footing 14, and bottom portion 13 being of about ¾ inch depth. This will allow sufficient protrusion for the inlet 16 to engage threadably or to couple with a union connecting to a source of pressure such as compressed air.

In employing the improved container of the present invention, the cover plate 21 is removed and the high viscosity, high molecular weight material such as a copolymer of isobutylene and isoprene is allowed to flow into the container. For example, the high molecular weight polymer may be fed directly from the hot mills of a copolymer process unit into the container until the desired weight, for example 50 to 100 pounds, has been allowed to flow therein. The cover plate 21 is then firmly affixed to the shoulder 20 by means of engaging means 22 and the container placed in suitable freight cars for shipping to the processing unit. On arrival at the precessing unit, rings 23 have attached thereto a sling of rope, chain, or the like, and the container lifted. By locating the rings 23 below the center of gravity, the container is inverted and the contents of the container 10 may be dumped on removal of cover plate 21. The latter may be accomplished by prizing the container open with a suitable sharp edged means. To facilitate the dumping of the container 10, a source of pressure, such as compressed air, may be attached to the inlet 16 and the high viscosity material caused to flow or fall from the container 10.

It may be desirable to coat the inner surfaces of the wall portion 11 with a suitable coating material such as a mixture of talc, zinc stearate, and the like.

When the high molecular weight material such as copolymer has been removed from the container 10, a number of them may be nested, loaded into freight cars, and returned for re-use. In nesting the containers in each other, the bottom portion 13 and footing 14 rests on the inner surface of bottom plate 12. The recess 15 allows the cover plate 19 sufficient clearance so that the inlet will not be damaged by the containers nesting one in another. The rings 23 may be constructed to fold to the sides of the container or may be flexible or otherwise suitably arranged so that the containers may be nested without interference.

By providing containers in accordance with the present invention, it is possible to return in one freight car a sufficient number of containers to fill 20 or 30 freight cars with loaded containers.

A considerable amount of savings inure to the containers of the present invention in shipping synthetic rubber since the cost of the cardboard containers for 50 pound shipments has run as high as fifty cents each, and it is understood that a commercial plant will produce 200,000 pounds daily of synthetic rubber. A considerable amount of the cost of the rubber is the cost of the shipping containers.

It will be obvious to one skilled in the art that while I have showed a container having the general shape of a frustrum of a rectangular pyramid as being preferred, other modifications may be used if desired. Thus, the bottom and top of the container may define a polygon having three, five, six, or more sides if desired.

The nature and objects of the present invention having been completely described and illustrated, what I wish to claim as new and useful and to secure by Letters Patent is:

A container designed to be nested with containers of the same size and construction comprising a straight sided wall portion in the shape of a frustrum of a rectangular pyramid having a comparatively small taper from top to bottom, a bottom portion comprising an extension of said wall portion defining a footing for supporting said container, a rectangular bottom member rigidly connected to and extending across said wall portion adjacent the bottom defining a closure for said container and a recessed space between the outer surface of said bottom member and said bottom portion, a check valve centered in said bottom portion defining an inlet to said container, a cover plate on said check valve arranged within said container, at least two oppositely arranged members defining engaging means arranged on the outer surface of said wall portion at points below the center of gravity of said container, an exterior shoulder on the outer periphery of the top of said container, a removable cover plate for said container, and means on said cover plate engageable with said shoulder.

FREDERICK A. PALMER.

REFERENCES CITED

The following references are of record in the file of this patent:

UNITED STATES PATENTS

| Number | Name | Date |
| --- | --- | --- |
| 615,090 | Myer et al. | Nov. 29, 1898 |
| 1,198,082 | Stollberg | Sept. 12, 1916 |
| 1,690,073 | Kincaid | Oct. 30, 1928 |
| 2,023,002 | Bosomworth | Dec. 3, 1935 |
| 2,196,081 | Reynoldson | April 2, 1940 |
| 2,363,521 | Grant, Jr. | Nov. 28, 1944 |
| 2,455,764 | Hartlove | Dec. 7, 1948 |